United States Patent
Usami

(10) Patent No.: US 6,721,402 B2
(45) Date of Patent: Apr. 13, 2004

(54) APPARATUS, METHOD, AND RECORD MEDIUM FOR AUTOMATICALLY CATEGORIZING RECEIVED MAIL MESSAGES

(75) Inventor: Shinya Usami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/118,239

(22) Filed: Apr. 9, 2002

(65) Prior Publication Data

US 2002/0154746 A1 Oct. 24, 2002

(30) Foreign Application Priority Data

Apr. 20, 2001 (JP) ........................................ 2001-122953

(51) Int. Cl.[7] ............................................. H04M 11/00
(52) U.S. Cl. .................. 379/93.24; 709/206; 379/93.17
(58) Field of Search ............................. 379/88.22, 67.1, 379/88.12, 100.08, 93.17, 93.24; 709/203, 200, 206, 207, 208

(56) References Cited

U.S. PATENT DOCUMENTS

| | | | | |
|---|---|---|---|---|
| 5,428,784 A | * | 6/1995 | Cahill, Jr. .................... | 709/206 |
| 6,151,507 A | * | 11/2000 | Laiho et al. ................. | 455/466 |
| 6,169,911 B1 | * | 1/2001 | Wagner et al. .............. | 455/566 |
| 6,442,589 B1 | * | 8/2002 | Takahashi et al. .......... | 709/203 |

FOREIGN PATENT DOCUMENTS

| | | |
|---|---|---|
| EP | 1 077 417 A2 | 2/2001 |
| GB | 2 355 162 A | 4/2001 |
| GB | 2 371 181 A | 7/2002 |
| JP | 03-232341 | 10/1991 |
| JP | 06-250950 | 9/1994 |
| JP | A 6-332822 | 12/1994 |
| JP | 11-068827 | 3/1999 |
| JP | 11-088425 | 3/1999 |
| JP | 11-175430 | 7/1999 |
| JP | 11-187064 | 7/1999 |
| JP | 2000-163339 | 6/2000 |
| JP | 2001-036688 | 2/2001 |

* cited by examiner

*Primary Examiner*—Fan Tsang
*Assistant Examiner*—Olisa Anwah
(74) *Attorney, Agent, or Firm*—Young & Thompson

(57) ABSTRACT

The present invention provides apparatus and method for automatically categorizing received mail messages. According to the apparatus and method, the importance of a received mail message is determined. Depending on the determined result, a reply mail message is sent. Alternatively, user is periodically notified of the received mail message. As a result, user can easily send a reply mail message or perform a callback. A controlling portion determines whether a sender mail address added to a received mail message or character information contained in a title of the received mail message has been registered with a memory. When the sender mail address or the character information has been registered, the received mail message is considered as an important mail message. Corresponding to schedule data recorded in the memory, a reply mail message is sent or user is notified of the received mail message using an audio alarm.

21 Claims, 6 Drawing Sheets

FIG.5

| TIME | SCHEDULE | RESPONSE |
|---|---|---|
| 9 | ORDINARY | POSSIBLE |
| 10 | VISITING A CLIENT | IMPOSSIBLE |
| 12 | TAKING A REST | POSSIBLE |
| 13 | ATTENDING AN IMPORTANT MEETING (FIRST MEETING ROOM) | IMPOSSIBLE |
| 15 | ORDINARY | POSSIBLE |
| 16 | ATTENDING A MEETING (SECOND MEETING ROOM) | POSSIBLE |
| 19 | ORDINARY | POSSIBLE |

APPARATUS, METHOD, AND RECORD MEDIUM FOR AUTOMATICALLY CATEGORIZING RECEIVED MAIL MESSAGES

BACKGROUND OF THE INVENTION

1. Field of the Invention

The present invention relates to an apparatus, method, and record medium for automatically categorizing received mail messages, in particular, to those for determining whether or not each received mail message is important and sending a reply mail message if it is determined that a mail message is important.

2. Description of the Related Art

In recent years, mobile communication terminal units such as portable telephone units have been widely used for electronic mail messages as well as calls. In addition, a service for forwarding an electronic mail message addressed to a personal computer disposed in an office to a mobile communication terminal unit has been accomplished.

However, when electronic mail messages addressed to a personal computer are forwarded to a mobile communication terminal unit, the number of mail messages increases in the mobile communication terminal unit. As a result, the management of mail messages becomes complicated. In addition, the received mail messages include not only important messages, but also unimportant messages. Thus, it is difficult for the user to quickly check important mail messages and sent their reply mail messages.

SUMMARY OF THE INVENTION

An object of the present invention is to provide apparatus, method, and program for determining whether or not each received mail message is important and sending a reply corresponding to the determined result or periodically notifying the user of that as an alarm so that he or she can easily send a reply mail message to a received mail message or performing a callback.

According to the present invention, there is provided an automatic received mail categorizing apparatus, comprising: means for registering predetermined character information; and means for, if character information added to a received mail matches the registered character information, displaying that a mail which includes the registered character information has been received.

The automatic received mail categorizing apparatus may further comprise: means for, if a mail address of a sender of the received mail matches the registered character information, displaying that the mail which includes the registered character information has been received.

The automatic received mail categorizing apparatus may further comprise: means for, if character information included in a title of the received mail matches the registered character information, displaying that the mail which includes the registered character information has been received.

The automatic received mail categorizing apparatus may further comprise: means for registering a schedule of a user; and means for, after receiving the mail, determining, on the basis of the schedule, whether or not it is possible to respond to the mail.

The automatic received mail categorizing apparatus may further comprise: means for, if it is determined, on the basis of the schedule after receiving the mail, that it is possible to respond to the mail, notifying with a sound that the mail has been received.

The automatic received mail categorizing apparatus may further comprise: means for, if it is determined, on the basis of the schedule after receiving the mail, that is it impossible to respond to the mail, creating a response mail responding to the received mail and sending the response mail to a sender of the received mail.

The automatic received mail categorizing apparatus may further comprise: means for, after sending the response mail, displaying that the response mail has been sent.

The automatic received mail categorizing apparatus may further comprise: means for, displaying with an icon that the mail which contains the registered character information has been received and that the response mail has been sent.

The automatic received mail categorizing apparatus may further comprise: means for, after the icon has been selected, displaying a simplified information list which does not include a body of the received mail or detailed information which includes the body of the received mail.

The automatic received mail categorizing apparatus may further comprise: means for, after a predetermined display region of the displayed detailed information is selected, displaying a screen for creating another response mail responding to the received mail of which detailed information is displayed.

The automatic received mail categorizing apparatus may further comprise: means for, after a predetermined display region of the displayed detailed information is selected, performing callback to a sender of the received mail of which detailed information is displayed.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a schematic diagram showing schedule data recorded in a memory of the automatic received mail message categorizing apparatus according to the embodiment of the present invention.

DESCRIPTION OF PREFERRED EMBODIMENT

Figure 1:
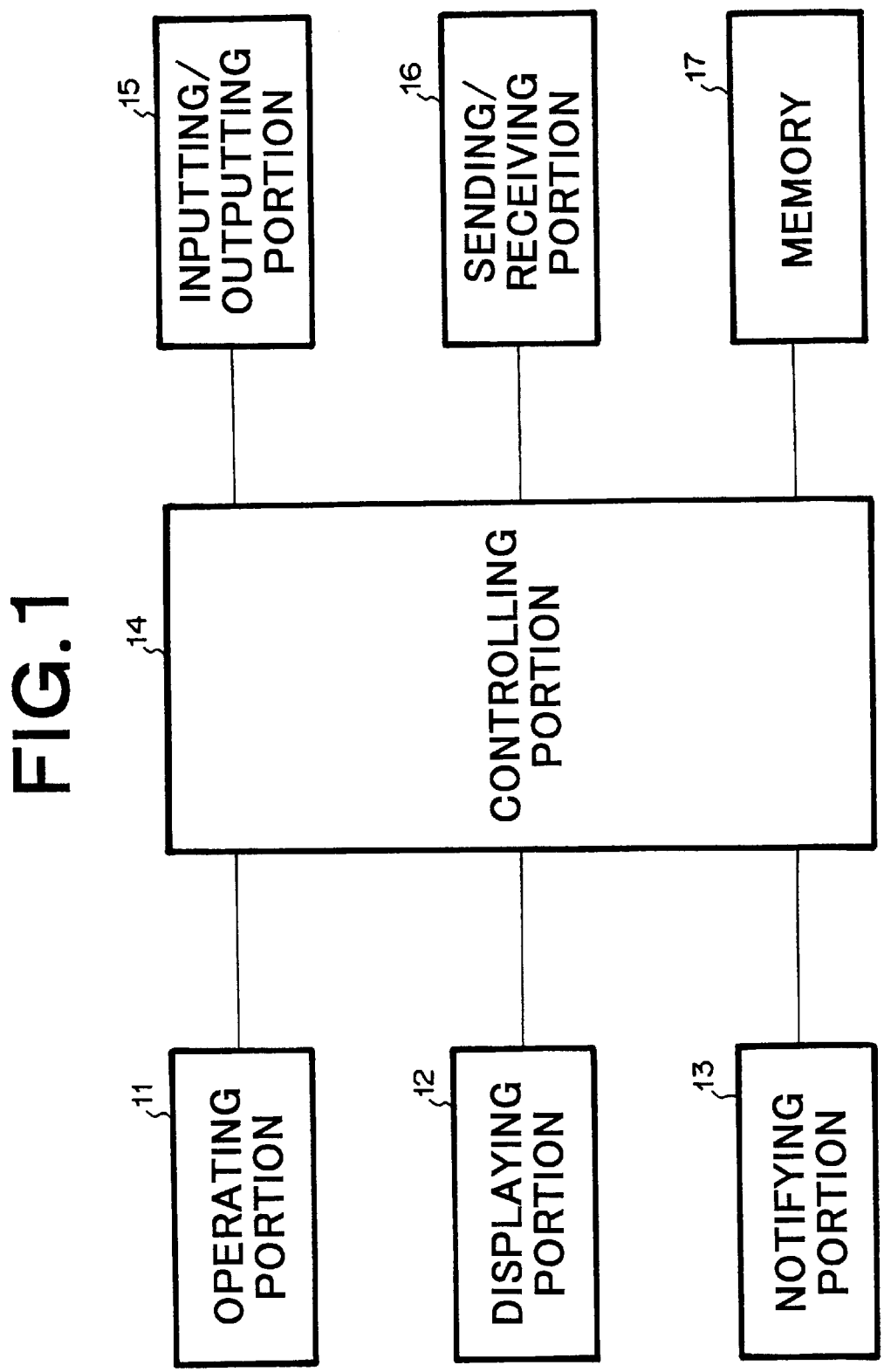
FIG. 1 is a schematic diagram showing the structure of an automatic received mail message categorizing apparatus according to an embodiment of the present invention.

FIG. 1 is a schematic diagram showing the structure of an automatic received mail message categorizing apparatus. Next, with reference to FIG. 1, the structure of the automatic received mail message categorizing apparatus according to the embodiment of the present invention will be described.

The automatic received mail message categorizing apparatus has an operating portion 11, a displaying portion 12, a notifying portion 13, a controlling portion 14, an inputting/outputting portion 15, a sending/receiving portion 16, and a memory 17.

The operating portion 11 allows the user to perform an inputting operation for the automatic received mail message categorizing apparatus. When the user edits (creates) a mail message, he or she performs a character inputting operation with the operating portion 11. The character data that is input with the operating portion 11 is displayed on the displaying portion 12 and recorded to the memory 17. The displaying portion 12 displays the state of the automatic received mail message categorizing apparatus, predetermined information, iconized alarms, and so forth.

The sending/receiving portion 16 performs sending and receiving in radio communications such as voice communications and sending and receiving of electronic mail messages. The memory 17 stores mail messages received by the sending/receiving portion 16 and mail messages created by the operating portion 11. In addition, the memory 17 stores electronic telephone directory data that contains information such as user name, telephone numbers, electronic mail addresses, and so forth. The user designates "importance: high" to important mail address information of the electronic telephone directory data. The memory 17 also stores predetermined information such as user's schedule data, settings, and so forth. The schedule data is data of user's schedule in a predetermined period. The user designates "response: impossible" to schedule data in a time zone in which the user cannot respond to a call nor a mail message.

The notifying portion 13 notifies the user of an incoming call received by the sending/receiving portion 16. In addition, the notifying portion 13 notifies the user of a state change in the automatic received mail message categorizing apparatus. Moreover, when a mail message is received, the notifying portion 13 notifies the user of that. The inputting/outputting portion 15 inputs and outputs a sound.

The controlling portion 14 controls each portion of the automatic received mail message categorizing apparatus. When a mail message is received from a sender side terminal unit, the controlling portion 14 searches for the electronic telephone directory data or the schedule data recorded in the memory 17 corresponding to information contained in the received mail message recorded in the memory 17. When the searched result represents that the received mail message satisfies a predetermined condition, the controlling portion 14 creates a reply mail message. The sending/receiving portion 16 sends the created reply mail message to the sender side terminal unit.

When the searched result represents that the condition for sending a reply mail message is not satisfied, the displaying portion 12 displays an icon, a message, or the like that represents that the condition is not satisfied. In addition to the displaying operation of the displaying portion 12, the notifying portion 13 notifies the user that the condition is not satisfied.

After the displaying portion 12 and the notifying portion 13 have performed the respective operations, when the user selects an icon, a message, or the like displayed on the displaying portion 12 with the operating portion 11, the received mail message is displayed on the displaying portion 12. The user checks the received mail message on the displaying portion 12. Thereafter, the user performs a voice communication and sends a mail message using the inputting/outputting portion 15 and the sending/receiving portion 16.

Figure 2:
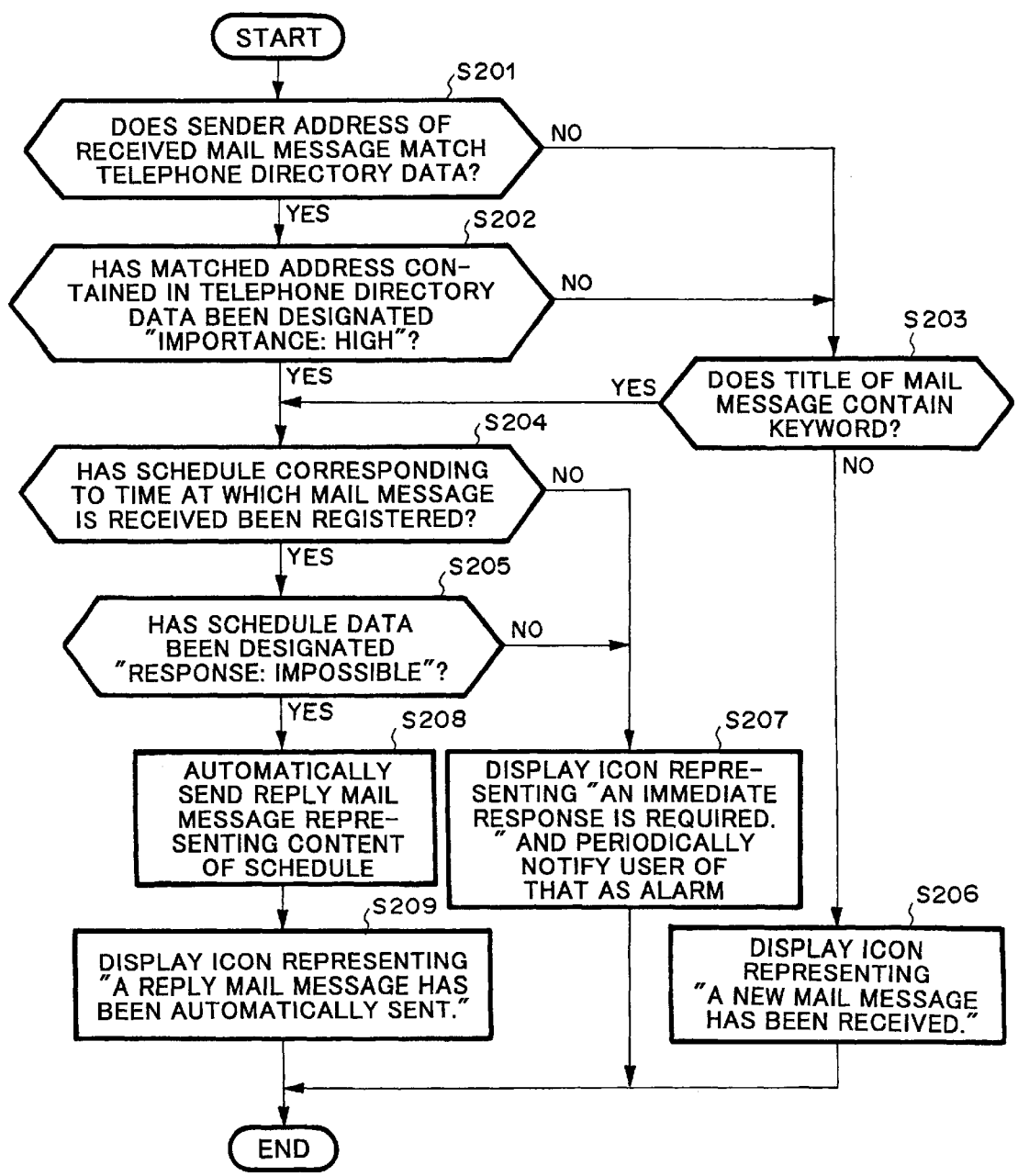
FIG. 2 is a flow chart showing a received mail message categorizing operation of the automatic received mail message categorizing apparatus according to the embodiment of the present invention.

FIG. 2 is a flow chart showing the received mail message categorizing operation of the automatic received mail message categorizing apparatus according to the embodiment of the present invention. Next, with reference to FIG. 1, corresponding to the flow chart of FIG. 2, the received mail message categorizing operation of the automatic received mail message categorizing apparatus according to the embodiment of the present invention will be described.

When the sending/receiving portion 16 receives a mail message, the controlling portion 14 searches the electronic telephone directory data for the sender mail address and determines whether or not the sender mail address matches an address contained in the electronic telephone directory data (at step S201).

When the determined result represents that the sender mail address matches an address contained in the electronic telephone directory data (namely, the determined result at step S201 is Yes), the controlling portion 14 determines whether or not the matched address contained in the electronic telephone directory data has been designated "importance: high" (at step S202).

When the determined result represents that the matched address contained in the electronic telephone directory data has not been designated "importance: high" (namely, the determined result at step S202 is No) or when the determined result represents that the sender mail address does not match any address contained in the electronic telephone directory data (namely, the determined result at step S201 is No), the controlling portion 14 determines whether or not the title of the received mail message contains one of received mail message categorizing keywords registered with the memory 17 (at step S203).

When the determined result represents that the title of the received mail message does not contain any keyword (namely, the determined result at step S203 is No), the displaying portion 12 displays an icon that represents that "A new mail message has been received." (at step S206). Thereafter, the received mail message categorizing operation is completed.

In this example, after the icon that represents that "A new mail message has been received." has been displayed, even if a further mail message that satisfies the icon displaying condition is received, the number of icons that are displayed does not increase. In other words, only one icon is displayed.

When the determined result represents that the matched address contained in the electronic telephone directory data has been designated "importance: high" (namely, the determined result at step S202 is Yes) or when the determined result represents that the title of the received mail message contains a keyword (namely, the determined result at step S203 is Yes), the controlling portion 14 searches the memory 17 for schedule data corresponding to the time at which the mail message has been received and determines whether or not the schedule data corresponding to the time at which the mail message has been received has been recorded in the memory 17 (at step S204).

When the determined result represents that the schedule data corresponding to the time at which the mail message has been received had not been recorded in the memory 17 (namely, the determined result at step S204 is No), the displaying portion 12 displays an icon that represents that "An immediate response is required.". In addition to the icon that represents that "An immediate response is required." displayed on the displaying portion 12, the notifying portion 13 and the inputting/outputting portion 15 notify the user of that as an audio alarm (at step S207). After the user has been notified, the received mail message categorizing operation of the automatic received mail message categorizing apparatus is completed.

After the icon that represents "An immediate response is required." has been displayed, when a mail message that satisfies the displaying condition is received, the number of icons displayed on the displaying portion 12 correspondingly increases. When the number of icons displayed on the displaying portion 12 exceeds a predetermined number registered with the memory 17, icons that exceed the predetermined number are erased in the order beginning from older mail messages on the displaying portion 12.

When the determined result represents that the schedule data corresponding to the time at which the mail message has been received had been recorded in the memory 17 (namely, the determined result at step S204 is Yes), the controlling portion 14 determines whether or not the schedule data corresponding to the time at which the mail message has been received had been designated "response: impossible" (at step S205).

When the determined result represents that the schedule data corresponding to the time at which the mail message has been received had not been designated "response: impossible" (in other words, the schedule data had been designated "response: possible") (namely, the determined result at step S205 is No), the displaying portion 12 displays an icon that represents that "An immediate response is required." (at step S207). Thereafter, the received mail message categorizing operation is completed.

When the determined result represents that the schedule data corresponding to the time at which the mail message has been received had been designated "response: impossible" (namely, the determined result at step S205 is Yes), a reply mail message whose content is "Now attending a conference.", "Now visiting a client." or the like is created. The sending/receiving portion 16 sends the created reply mail message to the terminal unit that has sent an original mail message (at step S208). The reply mail message that has been sent is recorded in the memory 17.

After the reply mail message has been sent, the displaying portion 12 displays an icon that represents "A reply mail message has been automatically sent." (at step S209). After the icon that represents "A reply mail message has been automatically sent." has been displayed, the received mail message categorizing operation of the automatic received mail message categorizing apparatus is completed.

Figure 3:
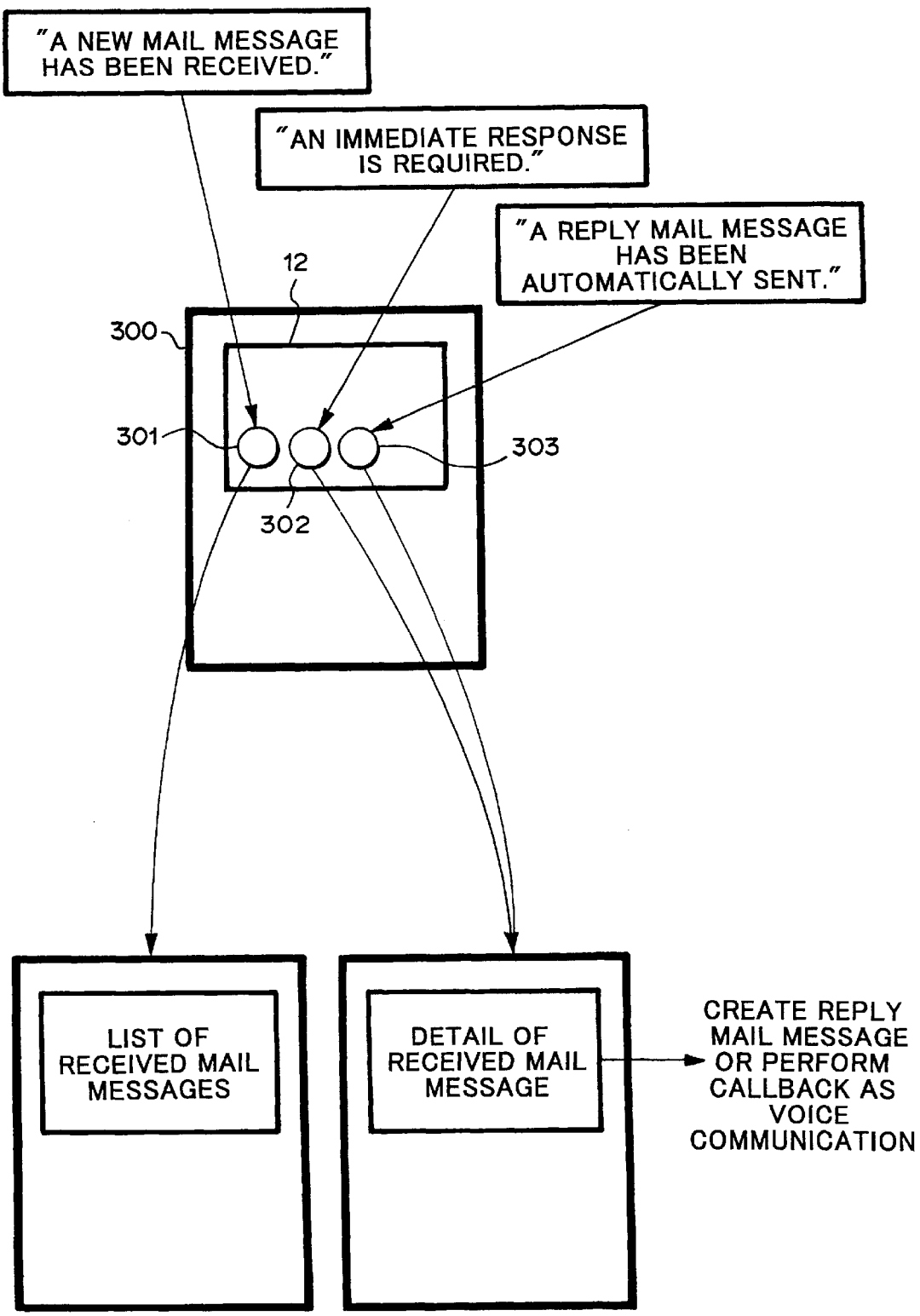
FIG. 3 is a schematic diagram showing icons of the automatic received mail message categorizing apparatus according to the embodiment of the present invention.

FIG. 3 is a schematic diagram showing icons of the automatic received mail message categorizing apparatus according to the embodiment of the present invention. Next, with reference to FIG. 3, a mail message displaying operation according to the embodiment of the present invention will be described. After the icons have been displayed, the mail message displaying operation is performed.

As shown in FIG. 3, the displaying portion 12 of the automatic received mail message categorizing apparatus 300 displays an icon 301 that represents "A new mail message has been received.", an icon 302 that represents "An immediate response is required.", and an icon 303 that represents "A reply mail message has been automatically sent.".

When the icon 301 that represents "A new mail message has been received." is selected on the displaying portion 12, the displaying portion 12 displays a list of mail messages received by the sending/receiving portion 16. When the icon 302 that represents "An immediate response is required." or the icon 303 that represents "A reply mail message has been automatically sent." is selected, the detail of the received mail message corresponding to the selected icon is displayed. Corresponding to the detail of the received mail message, a reply mail message in response to the received mail message is created or a callback as a voice communication is performed.

Figure 4:
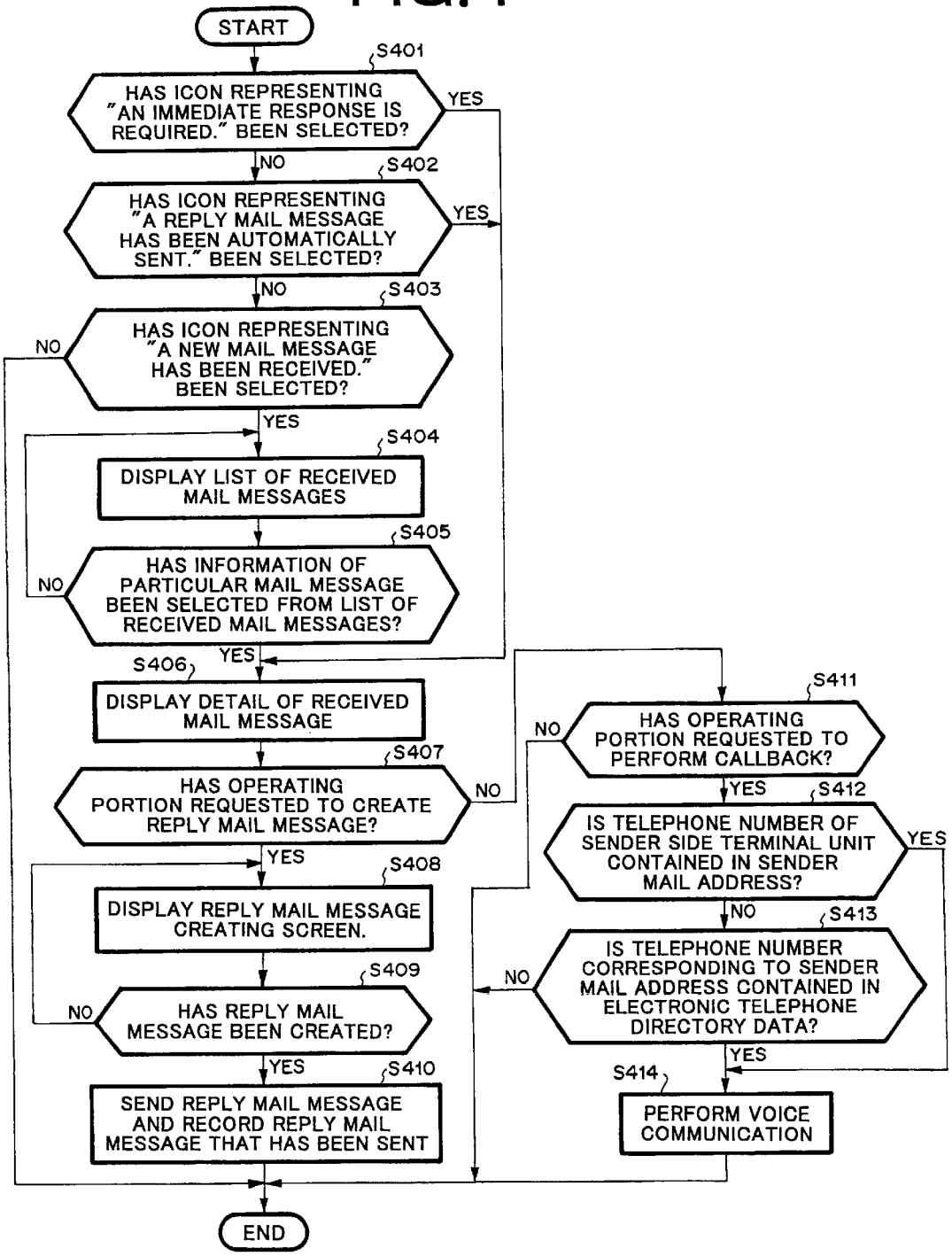
FIG. 4 is a flow chart showing a reply mail message creating operation of the automatic received mail message categorizing apparatus according to the embodiment of the present invention.

FIG. 4 is a flow chart showing a replying operation of the automatic received mail message categorizing apparatus according to the embodiment of the present invention. Next, with reference to FIG. 3, corresponding to the flow chart shown in FIG. 4, the replying operation of the automatic received mail message categorizing apparatus according to the embodiment of the present invention will be described. After one or more icons have been displayed, the replying operation is performed.

The controlling portion 14 determines whether or not the icon 302 that represents "An immediate response is required." has been selected from icons displayed on the displaying portion 12 (at step S401). When the determined result represents that the icon 302 that represents "An immediate response is required." has been selected (namely, the determined result at step S401 is Yes), the detail of the received mail message corresponding to the icon 302 that represents "An immediate response is required." is displayed on the displaying portion 12 (at step S406). When the icon 302 that represents "An immediate response is required." is selected, the icon 302 is erased from the displaying portion 12. In addition, the alarm is stopped.

When the determined result represents that the icon 302 that represents "An immediate response is required." has not been selected (namely, the determined result at step S401 is No), the controlling portion 14 determines whether or not the icon 303 that represents "A reply mail message has been automatically sent." has been selected (at step S402). When the determined result represents that the icon 303 that represents "A reply mail message has been automatically sent." has been selected (namely, the determined result at step S402 is Yes), the detail of the received mail message corresponding to the icon 303 that represents "A reply mail message has been automatically sent." is displayed on the displaying portion 12 (at step S406). When the icon 303 that represents "A reply mail message has been automatically sent." is selected, the icon 303 is erased from the displaying portion 12.

When the determined result represents that the icon 303 that represents "A reply mail message has been automatically sent." has not been selected (namely, the determined result at step S402 is No), the controlling portion 14 determines whether or not the icon 301 that represents "A new mail message has been received." has been selected (at step S403). When the determined result represents that the icon 301 that represents "A new mail message has been received." has not been selected (namely, the determined result at step S403 is No), the replying operation of the automatic received mail message categorizing apparatus is completed.

When the determined result represents that the icon 301 that represents "A new mail message has been received." has been selected (namely, the determined result at step S403 is Yes), the displaying portion 12 displays a list of received mail messages (at step S404). The list of received mail messages shows predetermined outlined information such as "sender user name" or "title" of each received mail message. When the icon 301 that represents "A new mail message has been received." is selected, the icon 301 is erased from the displaying portion 12.

The controlling portion 14 determines whether or not information of one received mail message has been selected from the list of the received mail messages displayed on the displaying portion 12 (at step S405). When the determined result represents that the information of one received mail message has not been selected (namely, the determined result at step S405 is No), the displaying portion 12 still displays the list of the received mail messages (at step S404).

When the determined result represents that information of a particular mail message has been selected (namely, the determined result at step S405 is Yes), the displaying portion 12 displays the detail of the selected received mail message (at step S406).

After the detail of the selected received mail message has been displayed, the controlling portion 14 determines whether or not the operating portion 11 has requested to create a reply mail message to the received mail message (at step S407).

When the determined result represents that the operating portion 11 has requested to create a reply mail message to the received mail message (namely, the determined result at step S407 is Yes), the displaying portion 12 displays a reply mail message creating screen (at step S408). The controlling portion 14 determines whether or not a reply mail message has been created (at step S409). When the determined result represents that a reply mail message has not been created (namely, the determined result at step S409 is No), the displaying portion 12 still displays the reply mail message creating screen (at step S408).

When the determined result represents that a reply mail message has been created (namely, the determined result at step S409 is Yes), the sending/receiving portion 16 sends the created reply mail message to the terminal unit that had sent the original mail message. The reply mail message that has been sent is recorded to the memory 17 (at step S410). After the reply mail message has been recorded, the replying operation of the automatic received mail message categorizing apparatus is completed.

When the determined result represents that the operating portion 11 has not requested to create a reply mail message (namely, the determined result at step S407 is No), the controlling portion 14 determines whether or not the operating portion 11 has requested to perform a callback as a voice communication (at step S411). When the determined result represents that the operating portion 11 has not requested to perform a callback (namely, the determined result at step S411 is No), the replying operation of the automatic received mail message categorizing apparatus is completed.

When the determined result represents that the operating portion 11 has requested to perform a callback (namely, the determined result at step S411 is Yes), the controlling portion 14 determines whether or not the sender mail address of the received mail message contains information of a sender telephone number (at step S412). When the determined result represents that the sender mail address contains a sender telephone number (namely, the determined result at step S412 is Yes), the inputting/outputting portion 15 and the sending/receiving portion 16 perform a voice communication corresponding to the sender telephone number (at step S414). After the voice communication has been completed, the replying operation of the automatic received mail message categorizing apparatus is completed.

When the determined result represents that the sender mail address of the received mail message does not contain a sender telephone number (namely, the determined result at step S412 is No), the controlling portion 14 determines whether or not the information of the telephone number corresponding to the sender mail address of the received mail message is contained in the electronic telephone directory data recorded in the memory 17 (at step S413).

When the determined result represents that the information of the sender telephone number is not contained in the electronic telephone directory data (namely, the determined result at step S413 is No), the replying operation of the automatic received mail message categorizing apparatus is completed.

When the determined result represents that the information of the sender telephone number is contained in the electronic telephone directory data (namely, the determined result at step S413 is Yes), the inputting/outputting portion 15 and the sending/receiving portion 16 perform a voice communication corresponding to the sender telephone number (at step S414). After the voice communication has been completed, the replying operation of the automatic received mail message categorizing apparatus is completed.

FIG. 5 is a schematic diagram showing schedule data recorded in the memory 17 and displayed on the displaying portion 12 of the automatic received mail message categorizing apparatus according to the embodiment of the present invention. Next, with reference to FIG. 5, schedule data according to the embodiment will be described.

The schedule data shown in FIG. 5 has fields "time", "schedule", and "response". In a time zone from 10 o'clock to 12 o'clock, the fields "schedule" and "response" are "schedule: visiting a client" and "response: impossible" representing that the user cannot respond to a mail message. In a time zone from 13 o'clock to 15 o'clock, the fields "schedule" and "response" are "schedule: attending an important meeting (first meeting room)" and "response: impossible". The field "schedule" may contain data on a place where the user will be (for example, first meeting room).

According to the embodiment, schedule data is tabulated. Alternatively, schedule data may be displayed in another form. In addition, according to the embodiment, the fields of the schedule data are "time", "schedule", and "response". The fields of the schedule data may be other than those.

Figure 6:
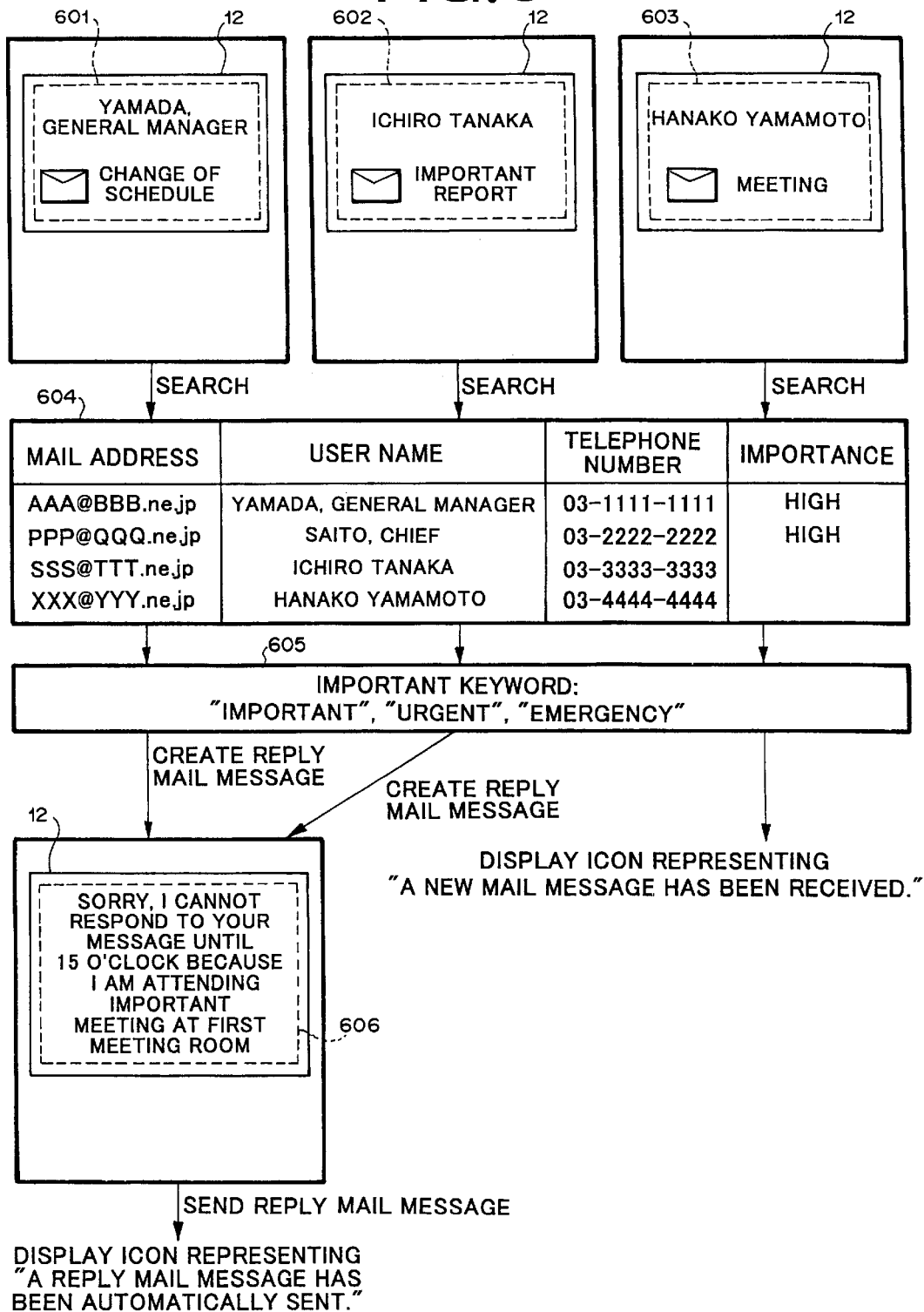
FIG. 6 is a schematic diagram showing the received mail message categorizing operation of the automatic received mail message categorizing apparatus according to the embodiment of the present invention.

FIG. 6 is a schematic diagram showing a received mail message categorizing operation of the automatic received mail message categorizing apparatus according to the embodiment. Next, with reference to FIGS. 5 and 6, the received mail message categorizing operation of the automatic received mail message categorizing apparatus will be described.

Referring to FIG. 6, the displaying portion 12 displays received mail messages 601 to 603 or a reply mail message 606. The received mail messages are categorized corresponding to electronic telephone directory data 604 and important keyword data 605 recorded in the memory 17.

The electronic telephone directory data 604 has fields "mail address", "user name", "telephone number", and "importance". When the sender mail address of a received mail message has been designated "importance: high", the received mail message is recognized as an important mail message. The electronic telephone directory data may contain other fields.

The important keyword data 605 has keywords "important", "urgent", and "emergency". When the title of a received mail message contains one of those keywords, the received mail message is recognized as an important mail message. The important keyword data may have other keywords.

The content of a reply mail message depends on schedule data. For example, the reply mail message 606 shown in FIG. 6 contains information of a current place of the user (first meeting room), a reason why the user cannot respond to a received mail message (attending an important meeting), and a period in which the user cannot respond to a received mail message (up to 15 o'clock). A reply mail message may contain other items.

Next, with reference to FIGS. 5 and 6, the case that the mail messages 601 to 603 are received in a time zone from 13 o'clock to 15 o'clock will be described.

When the sending/receiving portion 16 receives the mail message 601, the controlling portion 14 searches the memory 17 for data. The controlling portion 14 checks that the sender mail address of the received mail message 601 has been designated "importance: high" in the electronic telephone directory data. Thus, the controlling portion 14 recognizes the received mail message 601 as an important mail message and creates the reply mail message 606. The created reply mail message 606 is sent to the sender mail address "AAA@BBB.ne.jp" of the received mail message 601. After the reply mail message has been sent, the displaying portion 12 displays an icon that represents that "A reply mail message has been automatically sent.".

When the sending/receiving portion 16 receives the mail message 602, the controlling portion 14 searches the electronic telephone directory data 604 and checks that the sender mail address of the received mail message 602 has not been designated "importance: high" in the electronic telephone directory data 604. Thereafter, the controlling portion 14 searches the important keyword data 605. The title of the received mail message 602 is "important report" that contains an important keyword "important". Thus, the controlling portion 14 recognizes the received mail message 602 as an important mail message and creates the reply mail message 606. The created reply mail message 606 is sent to the sender mail address "SSS@TTT.ne.jp" of the received mail message 602. After the reply mail message has been sent, the displaying portion 12 displays an icon that represents that "A reply mail message has been automatically sent.".

When the sending/receiving portion 16 receives the mail message 603, the controlling portion 14 searches the electronic telephone directory data 604 and checks that the sender mail address of the received mail message 603 has not been designated "importance: high" in the electronic telephone directory data 604. Thereafter, the controlling portion 14 searches the important keyword data 605. The title of the received mail message 603 is "meeting" that does not contain any important keyword. Thus, the controlling portion 14 recognizes the received mail message 603 as an unimportant mail message. When the received mail message is recognized as an unimportant mail message, the displaying portion 12 displays an icon that represents that "A new mail message has been received.".

It is not always necessary to record (register) electronic telephone directory data, schedule data, important keyword data, and other data in the memory 17. Alternatively, they may be recorded (registered) to another record medium. When necessary, they may be downloaded through a network.

The above-described automatic received mail message categorizing apparatus may be a mobile communication terminal unit such as a cellular phone. Alternatively, the apparatus may be another terminal unit. According to the forgoing embodiment, the displaying portion 12 displays the icon 301 that represents "A new mail message has been received.", the icon 302 that represents "An immediate response is required.", and the icon 303 that represents "A reply mail message has been automatically sent.". Alternatively, the icon 302 may display other icons. In addition, the displaying portion 12 may display objects other than icons.

According to the forgoing embodiment, it is determined whether the sender mail address of a received mail message or characters contained in the title thereof have been registered with the memory 17. Corresponding to the determined result, a reply mail message is sent or a predetermined icon is displayed. Alternatively, character information contained in portions, such as a mail body, an attached file, other than the sender mail address and the title may be determined. In addition, a reply mail message may be sent or a predetermined icon may be displayed corresponding to information, such as a picture, a voice, other than character information contained in a received mail message.

As was described above, when a sender mail address added to a received mail message or a predetermined keyword contained in a title of a received mail message has been registered with the memory and when the mail message is received in a time zone in which schedule data has been designated "response: impossible", after the mail message is received, a reply mail message thereto is quickly created and sent to the sender of the received mail message. Thus, a response can be quickly taken for a received mail message considered as an important mail message.

In addition, when a sender mail address added to a received mail message or a predetermined keyword contained in a title of a received mail message has been registered with the memory and when the mail message is received in a time zone in which schedule data has been designated "response: possible", a message "An immediate response is required." and an alarm sound are periodically displayed and generated, respectively. As a result, a response to a received mail message considered as an important mail message can be prevented from being failed or delayed.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A method of automatically categorizing and reporting received communications, comprising the steps of:

comparing sender information in a communication received by a recipient to sender information stored in a memory;

when the sender information in the received communication matches sender information in the memory, determining whether the received communication has been designated with a predetermined urgency designation;

when the sender information in the received communication matches the sender information in the memory and has been designated with the predetermined urgency designation, comparing a time of receipt of the received communication to a schedule stored in the memory, wherein the schedule includes a time period when a response cannot be sent immediately;

when the sender information in the received communication matches the sender information in the memory and has been designated with the predetermined urgency designation and the time of receipt is during the time period when a response cannot be sent immediately, automatically sending a response from the recipient to the sender and displaying a first message to the recipient, the response indicating that the recipient is unavailable to reply immediately and the first message indicating that the response has been automatically sent;

when the sender information in the received communication matches the sender information in the memory and has been designated with the predetermined urgency designation and the time of receipt is not during the time period when a response cannot be sent immediately, initiating an alarm and displaying a second message to the recipient indicating that a communication has been received for which an immediate response is required;

when the sender information in the received communication does not match the sender information in the memory or the received communication has not been designated with the predetermined urgency designation, determining whether the received communication includes a predetermined keyword;

when the sender information in the received communication does not match the sender information in the memory or the received communication has not been designated with the predetermined urgency designation, and the received communication includes the predetermined keyword, comparing a time of receipt of the received communication to a schedule stored in the memory, wherein the schedule includes a time period when a response cannot be sent immediately;

when the sender information in the received communication does not match the sender information in the memory or the received communication has not been designated with the predetermined urgency designation, the received communication includes the predetermined keyword and the time of receipt is during the time period when a response cannot be sent immediately, automatically sending a response from the recipient to the sender and displaying said first message to the recipient, the response indicating that the recipient is unavailable to reply immediately; and when the sender information in the received communication does not match the sender information in the memory or the received communication has not been designated with the predetermined urgency designation, the received communication includes the predetermined keyword and the time of receipt is not during the time period when a response cannot be sent immediately, initiating an alarm and displaying said second message to the recipient.

2. The method of claim 1, further comprising the step of, when the sender information in the received communication does not match the sender information in the memory or the received communication has not been designated with the predetermined urgency designation, and the received communication does not include the predetermined keyword, displaying to the recipient a third message indicating that a communication has been received.

3. The method of claim 1, wherein the sender information comprises any one of a name, address, and telephone number of the sender.

4. The method of claim 1, further comprising the step of, when said first message is selected, displaying a contents of the received communication.

5. The method of claim 1, further comprising the step of, when said second message is selected, displaying a contents of the received communication.

6. The method of claim 1, further comprising the step of, when said third message is selected, displaying a list of the received communications concerned.

7. The method of claim 6, further comprising the step of, when any one of the received communications concerned in said list is selected, displaying a contents of the selected communication.

8. An apparatus for automatically categorizing and reporting received communications, comprising:

means for comparing sender information in a communication received by a recipient to sender information stored in a memory;

means for, when the sender information in the received communication matches sender information in the memory, determining whether the received communication has been designated with a predetermined urgency designation;

means for, when the sender information in the received communication matches the sender information in the memory and has been designated with the predetermined urgency designation, comparing a time of receipt of the received communication to a schedule stored in the memory, wherein the schedule includes a time period when a response cannot be sent immediately;

means for, when the sender information in the received communication matches the sender information in the memory and has been designated with the predetermined urgency designation and the time of receipt is during the time period when a response cannot be sent immediately, automatically sending a response from the recipient to the sender and displaying a first message to the recipient, the response indicating that the recipient is unavailable to reply immediately and the first message indicating that the response has been automatically sent;

means for, when the sender information in the received communication matches the sender information in the memory and has been designated with the predetermined urgency designation and the time of receipt is not during the time period when a response cannot be sent immediately, initiating an alarm and displaying a second message to the recipient indicating that a communication has been received for which an immediate response is required;

means for, when the sender information in the received communication does not match the sender information in the memory or the received communication has not been designated with the predetermined urgency designation, determining whether the received communication includes a predetermined keyword;

means for, when the sender information in the received communication does not match the sender information in the memory or the received communication has not been designated with the predetermined urgency designation, and the received communication includes the predetermined keyword, comparing a time of receipt of the received communication to a schedule stored in the memory, wherein the schedule includes a time period when a response cannot be sent immediately;

means for, when the sender information in the received communication does not match the sender information in the memory or the received communication has not been designated with the predetermined urgency designation, the received communication includes the predetermined keyword and the time of receipt is during the time period when a response cannot be sent immediately, automatically sending a response from the recipient to the sender and displaying said first message to the recipient, the response indicating that the recipient is unavailable to reply immediately; and means for, when the sender information in the received communication does not match the sender information in the memory or the received communication has not been designated with the predetermined urgency designation, the received communication includes the predetermined keyword and the time of receipt is not during the time period when a response cannot be sent immediately, initiating an alarm and displaying said second message to the recipient.

9. The apparatus of claim 8, further comprising the step of, when the sender information in the received communication does not match the sender information in the memory or the received communication has not been designated with the predetermined urgency designation, and the received communication does not include the predetermined keyword, displaying to the recipient a third message indicating that a communication has been received.

10. The apparatus of claim 8, wherein the sender information comprises any one of a name, address, and telephone number of the sender.

11. The apparatus of claim 8, further comprising the step of, when said first message is selected, displaying a contents of the received communication.

12. The apparatus of claim 8, further comprising the step of, when said second message is selected, displaying a contents of the received communication.

13. The apparatus of claim 9, further comprising the step of, when said third message is selected, displaying a list of the received communications concerned.

14. The apparatus of claim 13, further comprising the step of, when any one of the received communications concerned in said list is selected, displaying a contents of the selected communication.

15. A computer program product embodied on a computer-readable medium and comprising codes that, when executed, cause a computer to perform a method for automatically categorizing and reporting received communications, comprising the steps of:

comparing sender information in a communication received by a recipient to sender information stored in a memory;

when the sender information in the received communication matches sender information in the memory, determining whether the received communication has been designated with a predetermined urgency designation;

when the sender information in the received communication matches the sender information in the memory and has been designated with the predetermined urgency designation, comparing a time of receipt of the received communication to a schedule stored in the memory, wherein the schedule includes a time period when a response cannot be sent immediately;

when the sender information in the received communication matches the sender information in the memory and has been designated with the predetermined urgency designation and the time of receipt is during the time period when a response cannot be sent immediately, automatically sending a response from the recipient to the sender and displaying a first message to the recipient, the response indicating that the recipient is unavailable to reply immediately and the first message indicating that the response has been automatically sent;

when the sender information in the received communication matches the sender information in the memory and has been designated with the predetermined urgency designation and the time of receipt is not during the time period when a response cannot be sent immediately, initiating an alarm and displaying a second message to the recipient indicating that a communication has been received for which an immediate response is required;

when the sender information in the received communication does not match the sender information in the memory or the received communication has not been designated with the predetermined urgency designation, determining whether the received communication includes a predetermined keyword;

when the sender information in the received communication does not match the sender information in the memory or the received communication has not been designated with the predetermined urgency designation, and the received communication includes the predetermined keyword, comparing a time of receipt of the received communication to a schedule stored in the memory, wherein the schedule includes a time period when a response cannot be sent immediately;

when the sender information in the received communication does not match the sender information in the memory or the received communication has not been designated with the predetermined urgency designation, the received communication includes the predetermined keyword and the time of receipt is during the time period when a response cannot be sent immediately, automatically sending a response from the recipient to the sender and displaying said first message to the recipient, the response indicating that the recipient is unavailable to reply immediately; and when the sender information in the received communication does not match the sender information in the memory or the received communication has not been designated with the predetermined urgency designation, the received communication includes the predetermined keyword and the time of receipt is not during the time period when a response cannot be sent immediately, initiating an alarm and displaying said second message to the recipient.

16. The computer program product of claim 15, wherein said method further comprises the step of, when the sender information in the received communication does not match the sender information in the memory or the received communication has not been designated with the predetermined urgency designation, and the received communication does not include the predetermined keyword, displaying to the recipient a third message indicating that a communication has been received.

17. The computer program product of claim 15, wherein the sender information comprises any one of a name, address, and telephone number of the sender.

18. The computer program product of claim 15, wherein said method further comprises the step of, when said first message is selected, displaying a contents of the received communication.

19. The computer program product of claim 15, wherein said method further comprises the step of, when said second message is selected, displaying a contents of the received communication.

20. The computer program product of claim 16, wherein said method further comprises the step of, when said third message is selected, displaying a list of the received communications concerned.

21. The computer program product of claim 20, wherein said method further comprises the step of, when any one of the received communications concerned in said list is selected, displaying a contents of the selected communication.

* * * * *